United States Patent [19]
Ayers

[11] Patent Number: 5,832,531
[45] Date of Patent: Nov. 3, 1998

[54] METHOD AND APPARATUS FOR IDENTIFYING WORDS DESCRIBED IN A PAGE DESCRIPTION LANGUAGE FILE

[75] Inventor: Robert M. Ayers, Palo Alto, Calif.

[73] Assignee: Adobe Systems Incorporated, San Jose, Calif.

[21] Appl. No.: 884,004

[22] Filed: Jun. 27, 1997

Related U.S. Application Data

[63] Continuation of Ser. No. 304,762, Sep. 12, 1994, abandoned.

[51] Int. Cl.$^6$ .................................................. G06F 15/00
[52] U.S. Cl. ........................................................ 707/500
[58] Field of Search ................................... 707/500, 530

[56] References Cited

U.S. PATENT DOCUMENTS

| | | | |
|---|---|---|---|
| 4,741,045 | 4/1988 | Denning ................................... | 382/178 |
| 5,003,614 | 3/1991 | Tanaka et al. ........................... | 382/171 |
| 5,161,245 | 11/1992 | Fenwick ................................... | 382/231 |
| 5,167,016 | 11/1992 | Bagley et al. ........................... | 395/144 |
| 5,224,040 | 6/1993 | Tou ........................................... | 364/419 |
| 5,265,171 | 11/1993 | Sangu ....................................... | 382/177 |
| 5,278,918 | 1/1994 | Bernzott et al. ......................... | 382/176 |
| 5,321,770 | 6/1994 | Huttenlocher et al. ................. | 382/174 |
| 5,325,444 | 6/1994 | Cass et al. .............................. | 382/177 |
| 5,359,673 | 10/1994 | De La Beaujardiere ............... | 382/229 |
| 5,369,714 | 11/1994 | Withgott et al. ........................ | 382/177 |
| 5,384,864 | 1/1995 | Spitz ........................................ | 382/174 |
| 5,390,259 | 2/1995 | Withgott et al. ........................ | 382/173 |
| 5,410,611 | 4/1995 | Huttenlocher et al. ................. | 382/177 |
| 5,438,630 | 8/1995 | Chen et al. ............................... | 382/159 |
| 5,455,871 | 10/1995 | Bloomberg et al. .................... | 382/173 |
| 5,465,309 | 11/1995 | Johnson ................................... | 382/229 |
| 5,483,629 | 1/1996 | Motoyama et al. ..................... | 395/144 |
| 5,483,653 | 1/1996 | Furman .................................... | 395/650 |
| 5,488,719 | 1/1996 | Kaplan et al. ........................... | 395/600 |
| 5,491,760 | 2/1996 | Withgott et al. ........................ | 382/203 |
| 5,493,634 | 2/1996 | Bonk et al. .............................. | 395/101 |
| 5,504,843 | 4/1996 | Catapano et al. ....................... | 395/115 |
| 5,504,891 | 4/1996 | Motoyama et al. ..................... | 395/600 |
| 5,506,985 | 4/1996 | Motoyama et al. ..................... | 395/600 |
| 5,513,311 | 4/1996 | McKiel, Jr. .............................. | 395/161 |
| 5,539,841 | 7/1996 | Huttenlocher et al. ................. | 382/218 |

FOREIGN PATENT DOCUMENTS

| | | |
|---|---|---|
| 0 544 431 A2 | 6/1993 | European Pat. Off. . |
| 61-243531 | 10/1986 | Japan . |

OTHER PUBLICATIONS

Lau, "Building a Hypermedia Information System on the Internet", IPCC '94–Scaling New Heights in Technical Communication, Sep. 28, 1984, pp. 192–197.
Lang, "About GSview", GSview.exe help file, Jan. 1997.
Birrell et al., "The *Pstotext* Program", Oct. 29, 1996.
Birrell et al., "*Pstotext*", manpage documentation, http:/www.research. digital.com/SRC/virtualpaper/manpages/pstotext.1./html. Oct. 29, 1996.
R. Skinner, "Cross–Platform Formatting Programs," *Library Software Review*, 1994, vol. 13, n. 2, pp. 152–156.
IBM Technical Disclosure Bulletin, vol. 37, No. 5, May 1, 1994, pp. 163–166,"Generating Words from Characters using an Adaptive 'Learning' Algorithm".

*Primary Examiner*—Joseph R. Burwell
*Attorney, Agent, or Firm*—Fish & Richardson P.C.

[57] ABSTRACT

A method and apparatus for identifying words described in a page description file. A computer device stores a page description language file which includes characters that have not been identified as words by the page description language. A word identifying mechanism reads the page description language file and groups characters to form at least one word from the characters. The system preferably transfers words to a client process capable of processing words at a request of the client process. In a method for identifying words from a page description file, characters are read from the file and are stored in a word buffer until a word break is detected based upon character position data stored in the file. The contents of the word buffer are then provided to a client process as an identified word. The method can also sort the characters from the file into a display order prior to storing the characters in the word buffer. The method and apparatus can be used for searching for words in a page description file.

42 Claims, 11 Drawing Sheets

Figure 2

```
    1   2    3    4    5    6
43→ The quick brown fox jump-
42→    7   8   9   10   11
       ed over the lazy dog.
                  12
              Table 1
       13                    17
       Item                  Quantity
       Chairs¹⁴              ¹⁸10
       Desks¹⁵               ¹⁹3
22→    Tables¹⁶              ²⁰2
```

Figure 3a

```
46→         ┌47┐
       ↓  ↓    ↓
       The equa  including  is
       as follows:  = x + 2 in  cases.
       μ Δ π   tion  all
       ↑ ↑ ↑         ↑
        └──47──┘
```

Figure 3b

```
             48
22→       ┌─49─┐           14  4
          1    2    3
          The equation including μ is ← 53
          as follows:              ↑
                                   51
             15 7 16 8 9 17 10  49
             μ = Δx + π 2
          51  11 12  13    48
          in all cases.
```

METHOD AND APPARATUS FOR IDENTIFYING WORDS DESCRIBED IN A PAGE DESCRIPTION LANGUAGE FILE

This is a continuation of application Ser. No. 08/304,762, filed Sep. 12, 1994, now abandoned.

CROSS REFERENCE TO RELATED APPLICATIONS

Co-pending patent application Ser. No. 08/304,678, filed Sep. 12, 1994, abandoned, now Ser. No. 08/884,003, filed Jun. 27, 1997, and under obligation of assignment to a common assignee, by inventors Mohammad Daryoush Paknad and Robert M. Ayers, entitled, "Method and Apparatus for Identifying Words Described in a Portable Electronic Document", is related to the present application and is incorporated by reference herein.

BACKGROUND OF THE INVENTION

The present invention relates generally to the processing of digitally-stored objects, and more particularly to a method and apparatus for identifying words described by coded objects in a display file.

Characters, words, and other objects can be efficiently stored in files as high level codes, where each code represents an object. The characters or other object codes can be displayed, edited, or otherwise manipulated using an application program ("software") running on the computer. When displaying the characters with an output device such as a printer or display screen, the character codes can be rendered into bitmaps and/or pixel maps and displayed as a number of pixels. A pixel is a fundamental picture element of an image, and a bitmap is a data structure including information concerning each pixel of the image. Bitmaps, if they contain more than on/off information, are often referred to as "pixel maps."

There are several ways to display a coded object. A raster output device, such as a laser printer or computer monitor, typically requires a bitmap of the coded object which can be inserted into a pixel map for display on a printer or display screen. A raster output device creates an image by displaying the array of pixels arranged in rows and columns from the pixel map. One way to provide the bitmap of the coded object is to store an output bitmap in memory for each possible code. For example, for codes that represent characters in fonts, a bitmap can be associated with each character in the font and for each size of the font that might be needed. The character codes and font size are used to access the bitmaps. However, this method is very inefficient in that it tends to require a large amount of peripheral and main storage. Another method is to use a "character outline" associated with each character code and to render a bitmap of a character from the character outline and other character information, such as font and size. The character outline can specify the shape of the character and requires much less memory storage space than the multitude of bitmaps representing many sizes. The characters can thus be stored in a page description file which contains the character codes, font information, size information, etc. A commonly-used page description language to render bitmaps from character outlines is the PostScript® language by Adobe Systems, Inc. of Mountain View, Calif. Character outlines can be described in standard formats, such as the Type 1® format by Adobe Systems, Inc.

Finding word objects in a file that has been formatted in a page description language (PDL) can be difficult due to the diverse methods used to store the codes in the file. For example, application programs can generate a PDL file having a page full of characters. However, the order of the characters stored in the file does not necessarily equate with the order of the characters as displayed on the page. For example, each character or groups of characters can have a set of coordinates associated with it to provide the position on the page where the character is to be displayed. Since they are displayed in the position designated by their coordinates, they do not have to be sequentially stored in the file. This means the task of analyzing such a file for words is difficult, since characters or strings of characters that form a part of a word might be scattered about in the document. In addition, characters which typically separate words, such as spaces, do not have to be stored in the file, making the task of identifying words more difficult.

Another problem in distinguishing words in a PDL file occurs when different characters of the word have different characteristics. For example, a first character in an article might be quite large and spaced apart from the beginning column as a "drop-cap," where the remaining characters of the word are sized in accordance with the rest of the characters on the page. If only spacing or character characteristics are used to determine which characters are in a word, then a word having such a first character would not be distinguished as a whole word.

SUMMARY OF THE INVENTION

The present invention provides a method and apparatus for identifying words stored in a page description language file. The present invention can identify words from characters and strings of characters even though they are scattered within the file by processing the characters in a display order.

The apparatus of the present invention includes a system for identifying words in a page description language file. A computer device stores a page description language file which includes characters that have not been identified as words by the page description language. A word identifying mechanism reads the page description language file and groups characters to form a word or a number of words from the characters. The system preferably transfers words to a client process capable of processing the words.

The system preferably retrieves one character at a time from the page description file by executing PDL commands stored in the page description file. The system optionally sorts the characters into a display order prior to grouping the characters into words. Each character preferably has an associated x coordinate and y coordinate which define an x,y coordinate pair indicating where said character is to be displayed on a page. The system can sort the characters first by the y coordinates and then by the x coordinates prior to grouping the characters. The system also includes a line buffer which stores characters having the same y coordinate read from the page description language file so that these characters can be grouped together into words. The system also includes a word buffer, where the system sequentially stores characters from the line buffer into the word buffer until a word break is detected. A word break is determined by the first detection of a termination character, an end of the line buffer, or a space. A space, for example, is detected by a heuristic which considers the difference in x coordinates between adjacent characters in the line buffer.

The present invention further includes a method for identifying words from a collection of characters having associated character position data, such as in a page description file. Preferably, characters are read from the collection of characters and are stored in a word buffer until a word break is detected based upon the character position data. The contents of the word buffer are then provided to a client process as an identified word. The method can further include a step of sorting the characters from the collection into a display order prior to storing the characters in the word buffer. Characters having the same y (vertical) coordinate from the collection are preferably first stored in a line buffer before being stored in the word buffer. Line characteristics of the characters in the line buffer are calculated and are used to store characters from the line buffer in the word buffer. Preferably, characters are sequentially stored in the word buffer from the line buffer until a word break is detected in the line buffer. A word break can include a change in y coordinate of a character, a space, or a termination character. The character(s) in the word buffer are considered a word fragment if the last character from the line buffer is a hyphen or if the character in the word buffer is a "drop-cap." The word fragment may be concatenated with the next word identified after the word fragment when appropriate. The identified word is preferably provided to the client process when the client process requests the identified word.

In yet another aspect of the present invention, a method for detecting words in a page description language file is implemented on a computer system. A plurality of characters derived from the page description language file are first read and stored in a line buffer. Gap and character characteristics are then calculated from the characters in the line buffer, and a character is moved from the line buffer into a word buffer. The calculating and moving steps are repeated until a word break is detected using the calculated gap and character characteristics, or if the line buffer is empty. The characters in the word buffer are then identified as a word. Optionally, the characters from the page description file are sorted into a display order prior to storing the characters in the line buffer.

In another aspect of the present invention, a method for searching for a word in a page description language file is implemented on a computer system. A search word is received from a client process and characters in said page description language file are processed based upon associated character coordinates of the characters. A list of identified words, including word coordinates, is created from the characters. The list of identified words is then compared to the search word, and the coordinates of words in the list which match the search word are provided to the client process.

An advantage of the present invention is that words are identified in a page description file which may include characters and strings of characters stored in formats from which it is difficult to directly obtain words. PDL files can store characters in a very scattered order and often provide no whitespace characters to divide words. The present invention sorts the characters according to their displayed order and position and can provide the words to a requesting client process.

Another advantage of this invention is that words can be identified in a page description having a wide variety of different formats. For example, words having characters different fonts, size, position, and other display characteristics can be readily identified.

These and other advantages of the present invention will become apparent to those skilled in the art upon a reading of the following specification of the invention and a study of the several figures of the drawing.

BRIEF DESCRIPTION OF THE DRAWINGS

FIG. 2 is a diagrammatic illustration of a portion of a display screen showing displayed images from a page description language (PDL) file;

FIG. 3a is a diagrammatic illustration of a PDL file;

FIG. 3b is a diagrammatic illustration of a portion of a display screen showing displayed images derived from the PDL file shown in FIG. 3a;

DETAILED DESCRIPTION OF THE PREFERRED EMBODIMENT

The present invention is well-suited for identifying words in a page description language (PDL) file that includes different types of character characteristics, spacing characteristics, and formatting variations. The present invention is suitable for providing words to a client application program which searches page description files or provides distinct words or multiple words to a user.

A number of terms are used herein to describe images and related structures. "Pixel" refers to a single picture element of an image. Taken collectively, the pixels form the image. "Bitmap" refers to bits stored in digital memory in a data structure that represents the pixels. As used herein, "bitmap" can refer to both a data structure for outputting black and white pixels, where each pixel either is on or off, as well as a "pixel map" having more information for each pixel, such as for color or gray scale pixels. "Render" refers to the creation of a bitmap from an image description, such as a character outline. "Raster" refers to the arrangement of pixels on an output device that creates an image by displaying an array of pixels arranged in rows and columns. Raster output devices include laser printers, computer displays, video displays, LCD displays, etc. "Coded" data is represented by a "code" that is designed to be more concise and to be more readily manipulated in a computing device than raw data, in, for example, bitmap form. For example, the lowercase letter "a" can be represented as coded data, e.g., the number 97 in ASCII encoding.

Figure 1:
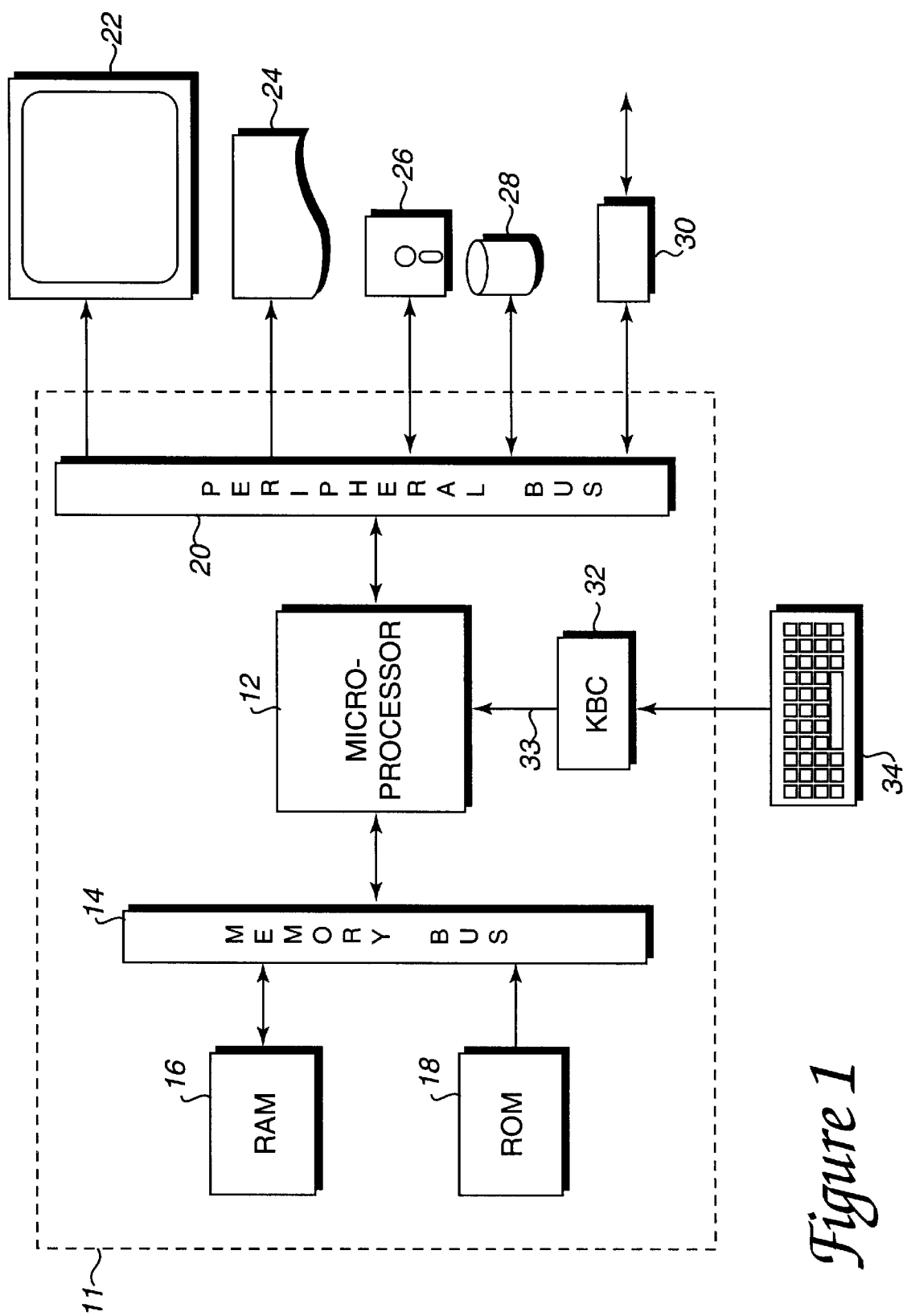
FIG. 1 is a block diagram of a computer system for identifying words in a page description file in accordance with the present invention.

In FIG. 1, a computer system 10 for distinguishing words in a PDL file includes a digital computer 11, a display screen 22, a printer 24, a floppy disk drive 26, a hard disk drive 28, a network interface 30, and a keyboard 34. Digital computer 11 includes a microprocessor 12, a memory bus 14, random access memory (RAM) 16, read only memory (ROM) 18, a peripheral bus 20, and a keyboard controller 32. Digital computer 11 can be a personal computer (such as an IBM-PC AT-compatible personal computer), a workstation (such as a SUN or Hewlett-Packard workstation), etc.

Microprocessor 12 is a general purpose digital processor which controls the operation of computer system 10. Microprocessor 12 can be a single-chip processor or can be implemented with multiple components. Using instructions retrieved from memory, microprocessor 12 controls the reception and manipulation of input data and the output and display of data on output devices. In the described embodiment, a function of microprocessor 12 is to examine a coded file and detect objects within that file. The objects can be used, for example, by different application programs which are implemented by microprocessor 12 or other computer systems.

Memory bus 14 is used by microprocessor 12 to access RAM 16 and ROM 18. RAM 16 is used by microprocessor 12 as a general storage area and as scratch-pad memory, and can also be used to store input data and processed data. ROM 18 can be used to store instructions followed by microprocessor 12 as well as image descriptions and character outlines used to display images in a specific format. For example, input data from a file can be in the form of PostScript or other page description language character codes to represent characters. The characters' associated character outlines can be retrieved from ROM 18 when bitmaps of the characters are rendered to be displayed as rendered images by a raster output device. Alternatively, ROM 18 can be included in an output device, such as printer 24.

Peripheral bus 20 is used to access the input, output, and storage devices used by digital computer 11. In the described embodiment, these devices include display screen 22, printer device 24, floppy disk drive 26, hard disk drive 28, and network interface 30. Keyboard controller 32 is used to receive input from keyboard 34 and send decoded symbols for each pressed key to microprocessor 12 over bus 33.

Display screen 22 is an output device that displays images of data provided by microprocessor 12 via peripheral bus 20 or provided by other components in the computer system. In the described embodiment, display screen 22 is a raster device which displays images on a screen corresponding to bits of a bitmap in rows and columns of pixels. That is, a bitmap can be input to the display screen 22 and the bits of the bitmap can be displayed as pixels. An input bitmap can be directly displayed on the display screen, or components of computer system 10 can first render codes or other image descriptions from a page description file into bitmaps and send those bitmaps to be displayed on display screen 24. Raster display screens such as CRT's, LCD displays, etc. are suitable for the present invention.

Printer device 24 provides an image of a bitmap on a sheet of paper or a similar surface. Printer 24 can be a laser printer, which, like display screen 22, is a raster device that displays pixels derived from bitmaps. Printer device 24 can print images derived from coded data such as found in a page description language file. Other output devices can be used as printer device 24, such as a plotter, typesetter, etc.

To display images on an output device, such as display screen 22 or printer 24, computer system 10 can implement one or more types of procedures. One procedure is to transform coded objects into image descriptions. For example, the code for a text character is a portion of an image description which takes up less memory space than several copies of the bitmap of the recognized character. The text character code can include associated information which specify how the character is to be displayed, such as positional coordinates, size, font, etc. A well known page description language for specifying image descriptions is the PostScript® language by Adobe Systems, Inc. of Mountain View, Calif. The image description can reference stored character outlines which describe the shape of the character and includes other rendering information. A well-known character outline format is the Type 1® format, by Adobe Systems, Inc. Using character outlines, computer system 10 can render a bitmap for each character and send the bitmap to a memory cache or other storage area that is accessible to an output device for display. In other embodiments, output devices such as printers can include microprocessors or similar controllers which can render a bitmap from character outlines. Herein, a "page description language (PDL) file" is a file or similar storage unit which includes objects of an image description stored in a page description language such as PostScript.

Floppy disk drive 26 and hard disk drive 28 can be used to store bitmaps, image descriptions (coded data), and character outlines, as well as other types of data. Floppy disk drive 26 facilitates transporting such data to other computer systems, and hard disk drive 28 permits fast access to large amounts of stored data such as bitmaps, which tend to require large amounts of storage space. Other mass storage units such as nonvolatile memory (e.g., flash memory), PC-data cards, or the like, can also be used to store data used by computer system 10.

Network interface 30 is used to send and receive data over a network connected to other computer systems. An interface card or similar device and appropriate software implemented by microprocessor 12 can be used to connect computer system 10 to an existing network and transfer data according to standard protocols.

Keyboard 34 is used by a user to input commands and other instructions to computer system 10. Images displayed on display screen 22 or accessible to computer system 10 can be edited, searched, or otherwise manipulated by the user by inputting instructions on keyboard 34. Other types of user input devices can also be used in conjunction with the present invention. For example, pointing devices such as a computer mouse, a track ball, a stylus, or a tablet can be used to manipulate a pointer on a screen of a general-purpose computer.

FIG. 2 is a diagrammatic illustration of a portion of a display screen 22 showing displayed images from a PDL file. A PDL file input to the present invention can have a wide variety of formats. Typically, objects such as characters or words are be stored as codes, where a display command such as "SHOW" can be instruction to the microprocessor to display one or more codes by an output device. A character code associated with the command is displayed at a location specified by coordinates provided with each display command. The coordinates typically include an x (horizontal) coordinate and a y (vertical) coordinate. Codes may be grouped together as multiple characters or a string for a single display command, or may be singly displayed by a single command. Font and size information can also be associated with each display command or character code in the PDL file to provide the display characteristics of the codes. For example, the font information includes information about which font the characters are to be displayed in, and may also include information concerning the re-mapping of the character code to a different character. For example, a character code "97" in the PDL file might normally represent an "a" character; however, in another font, this can be a completely different character. A transformation matrix or similar instructions can also accompany a character if the character is to be rotated or positioned in a non-standard orientation. The creation of a PDL file is well known to those skilled in the art.

Referring to FIG. 2, display screen 22 shows displayed images derived from a PDL file. Text images 42 are displayed on the screen from the codes, font information, size information, coordinate information, etc. stored in the PDL file, and are typically derived from rendered bitmaps as explained above with reference to FIG. 1. Text images 42 can also be displayed on a sheet of paper output by printer 24. The computer determines the font and size of each character to be displayed by examining the associated font and size information in the PDL file. Character image 43 is shown having a larger size than the other displayed character images and is shown as a "drop-cap." A drop-cap is typically a capital letter which starts a paragraph or document and which is much larger and positioned offset from the rest of the word and the line it is associated with. Character image 45 is a hyphen which indicates that the word just prior to the hyphen should be concatenated with the first word of the next line. A number 44 shown above each character or string is not actually displayed on screen 22, but is shown in FIG. 2 to indicate the order which the string is stored in the PDL file and the order which the computer executes and displays the words on the screen from the PDL file. The order of characters as stored in the PDL file are referred to herein as the "stored order." The order of the characters as displayed in their final positions is referred to as the "display order." For example, the character "T" is displayed first according to the stored order (number 1), followed by the string "he" (number 2), etc. For the example of FIG. 2, the stored order and the display order of the words is the same.

FIG. 3a is a diagrammatic illustration of a PDL file 46. A number of strings 47 are shown in file 46 having a particular stored order, where the order of strings in the file is shown in an order of left-to-right, up-to-down. Commands, coordinates, font and size information, and other information are still present in file 46 but are omitted from FIG. 3a for brevity.

FIG. 3b is a diagrammatic illustration of a portion of a display screen 22 showing the display order of images derived from the PDL file 46 shown in FIG. 3a. Text 48 corresponds to the characters stored in the PDL file, and each character (or string of characters) is displayed at a position determined by its associated coordinates. However, the final display order of the characters on the screen (left-to-right, up-to-down) is not the same as the stored order of the characters in the PDL file (shown by numbers 49 above each displayed string). Greek symbols 51 were stored last in PDL file 46, but are finally displayed between other strings on screen 22. The word "all" and word fragment "tion" are positioned last in the file but are positioned in the middle of the display order. Thus it can be difficult to distinguish words in a PDL file if the characters and strings in the file are examined in the order they are stored; the characters can be placed in a stored order in the PDL file which does not correspond to the final display order of the characters on the screen or sheet of paper.

In the described embodiment, the characters can be sorted and reordered in a buffer according to their coordinates. When the characters are retrieved and processed as determined by PDL commands and coordinates, they are thus processed in their final display order. One line of displayed characters is processed at a time, where a "line" includes all characters having the same baseline coordinate. A text baseline is a line with which the bottom ends of non-descending characters in a line of text are aligned. Thus, in the example of FIG. 3b, all the characters of line 53 have the same baseline coordinate. The exponent "2" of "π2" would be considered on its own line, however, since the baseline of the "2" is at a different y coordinate from the π character. The process of examining lines in a page description file is described with reference to FIGS. 4a and 4b.

Figure 4A:
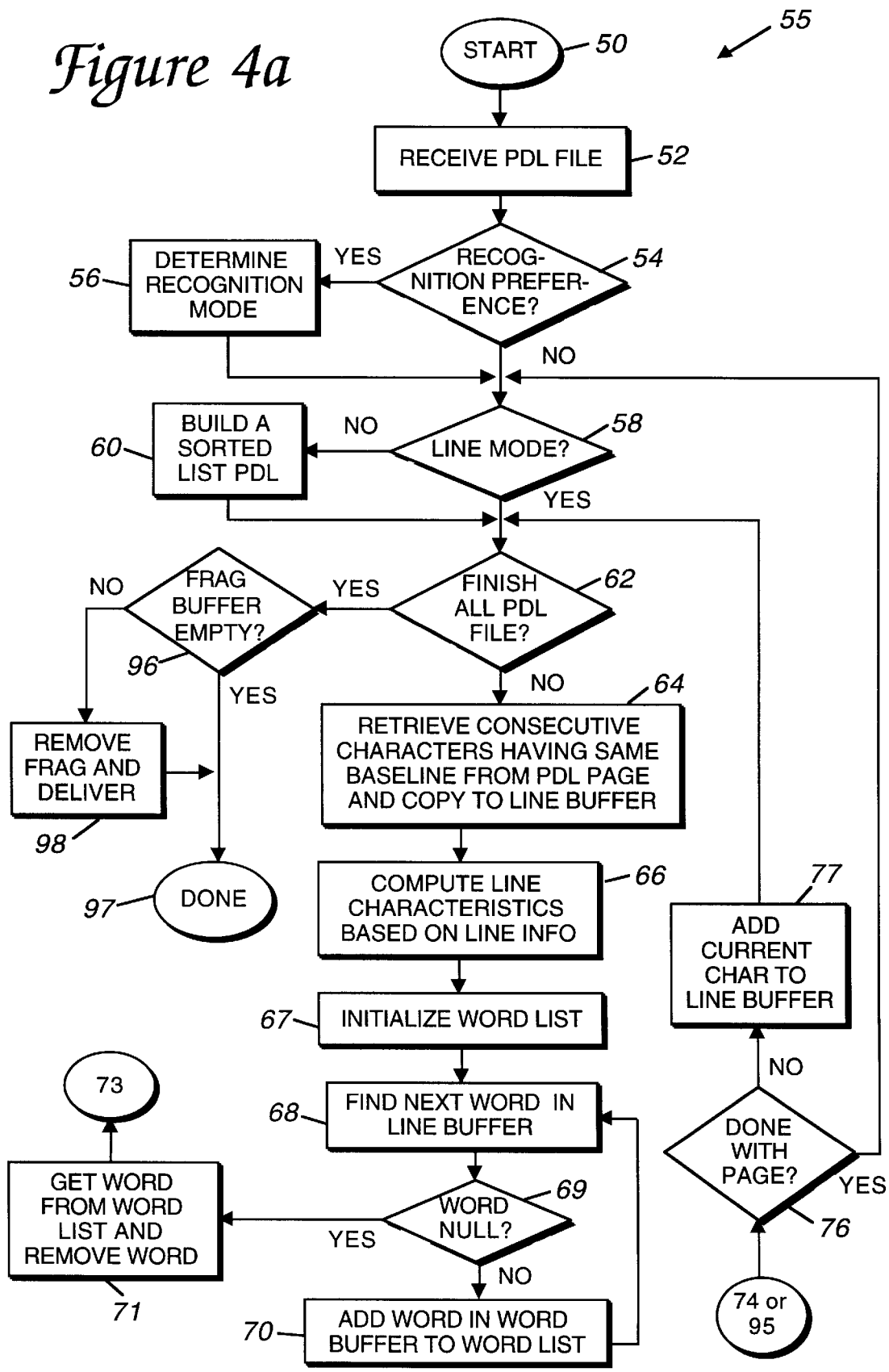
FIG. 4a is a flow diagram illustrating a first portion of the process of the present invention for identifying words in a PDL file.

FIG. 4a is a flow diagram illustrating the process 55 of the present invention for identifying words in a PDL file, where characters from the file are grouped into words. The process begins at 50. In step 52, computer system 10 receives a PDL file. A PDL file, as described above, is a file which includes coded objects which have been stored in a page description language. Page description languages, such as PostScript, can be used to store the identity of an object and related information associated with the object used to display the object. For example, a page of text characters or strings of characters can be stored in a PDL file as codes representing the identity of the characters, as well as the locations to display the characters, and font information, size and orientations of the characters. PDL files differ from normal ASCII text files, since ASCII text files include only ASCII codes of characters which are displayed in the sequence of the characters as stored in the file.

In the described embodiment, the PDL file is received from another application program implemented by the microprocessor 12 (or a different computer system which provides data to microprocessor 12, for example, through network interface 30 or floppy disk 26). Application programs which can create the PDL file include programs which can recognize bitmaps and create a coded PDL file from the bitmap. The PDL file can be provided to, for example, application programs which have their own functions to manipulate the PDL file and are well-known to those skilled in the art. For example, a search and retrieval mechanism might allow a user to search an electronic document, such as a PDL file, for words and phrases. Such a mechanism can send the PDL file to the process of the present invention, which would identify words in the PDL file and provide (or "transfer") those words to the retrieval mechanism. Such application programs which can provide the PDL file to the present invention and can receive the output of the present invention, are referred to as "clients" or a "client process." Alternatively, the process of the present invention can output words to a file. For example, in a "batch mode," the present invention would detect all the words in a PDL file and output those words to a "processed" destination file; the "client" in this case could simply be the destination file.

In addition to sending a PDL file to computer system 10 running the process of the present invention, the client can also send additional information related to the characters in the PDL file. This additional information can include, for example, a table of categories which provides the category of each type of character in the file. For example, the table can indicate whether a character is whitespace (tab or space), a letter, a digit, punctuation, accent-mark, quote mark, hyphen, "OK in word" (the character may be positioned in a word), or "OK in number" (the character may be positioned in a number). A character can be in more than one category. If the client does not supply all or some of the above additional information, the process of the present invention can use a default table with standard categories for characters that are well known to those skilled in the art. The client can also supply a list of characters which are ligatures, which are two or more characters which are joined together, such as "ae", as well as the distinct characters that make up the ligatures (e.g., "a" and "e"). Other information about irregular characters or strings can also be provided by the client.

In next step 54, the microprocessor checks if a recognition preference has been sent by the client to indicate how the present invention is to detect words. If a recognition preference is present either in the PDL file (such as in a file header) or sent as a separate command from the client, the process continues to step 56. In step 56, the recognition mode to be used on the PDL file is determined. In the described embodiment, the desired recognition mode can be explicitly indicated in the PDL file or by a command or flag set by the client. In alternate embodiments, the recognition mode can be interpreted by the present invention by examining the PDL file.

In the described embodiment, two recognition modes are provided: line mode and page mode. In line mode, the microprocessor examines one line of objects, such as text characters, from the PDL file and processes the examined line before examining another line from the PDL file. In page mode, the microprocessor reorganizes an entire page of objects into an ordered buffer, and then performs a line mode analysis on the buffer as described above. Page mode is useful to detect words in PDL files which store characters in a different order than the order in which the characters finally displayed, such as in the example shown in FIGS. 3a and 3b. The modes are described in greater detail below.

After step 56, or if there is no recognition preference in step 54, then step 58 is implemented. In step 58, the microprocessor checks if the recognition mode to be used is line mode. If no recognition mode has been indicated, then the default mode is line mode. If the determined recognition mode is not line mode, then page mode has been selected, and step 60 is implemented.

In step 60, a page's worth of objects are read from the PDL file. In the described embodiment, the objects are characters (or strings of characters) which form lines of words in the PDL file, as shown in FIG. 2. A number of characters which fill a page are read from the PDL file and stored in a page buffer. In the described embodiment, the characters in the page buffer are then sorted so that the page buffer contains ordered and horizontally-oriented characters. The characters are first examined to determine if they are rotated from the standard, "portrait" orientation. Characters are positioned in the standard orientation when the characters form lines of text which are read in a left to right direction on a portrait-oriented page. If any characters are not in the standard orientation, those characters are rotated to the standard orientation. In the described embodiment, a character with non-standard orientation, such as being rotated by 90 degrees, is detected by examining a orientation portion of the PDL file such as a transformation matrix (not shown). If the character is in a 90° rotated orientation, the x and y coordinates of the character are swapped to rotate the character ninety degrees to the standard position.

After the characters have been oriented in the standard orientation (if necessary), the characters are sorted according to the positions of the characters on the page. The y coordinates of all the characters on the page are first sorted so that the characters are stored in an order of ascending y coordinates. The x coordinates of the characters are then sorted so that the characters are stored in an order of ascending x coordinates. This creates a buffer having characters stored and ordered in their final displayed positions according to the character coordinates.

Once an x-y sorted page list has been built in step 60, if line mode had been selected for step 58, then step 62 is implemented. In step 62, the microprocessor checks if the entire PDL file has been examined for words. If so, then process continues to step 96, detailed below. If the entire PDL file has not been checked, the process continues to step 64, in which consecutive characters having the same baseline are retrieved from the PDL page. The commands and code in the PDL file are executed as if the characters were to be displayed so that the characters are retrieved in their displaying order, one character at a time. The execution/displaying order of characters is not necessarily the order of the characters as stored in the PDL file, since the commands and operators can push characters on and off the stack in different ways, cause a single character to be displayed multiple times, etc., as is well-known to those skilled in the art. The characters are retrieved and processed according to data in the PDL file if the process is in line mode, and the characters are retrieved and processed according to data in the sorted page buffer if the process is in page mode. The characters having the same baseline are copied to a line buffer for further processing in step 66. Each character is also preferably read into a "current character" buffer, which holds at least one character, before being added to the line buffer. Step 64 is described in greater detail with respect to FIG. 5.

In next step 66, the microprocessor computes the characteristics of the line of characters stored in the line buffer based on information in the line buffer. Spacing and character characteristics are computed and made ready for use in step 68 of the process, detailed below. Step 66 is described in greater detail with respect to FIG. 6. In step 67, a word list is initialized. The word list is an array of storage locations to store all the words identified on the current line from the PDL file. In next step 68, the microprocessor uses the line characteristics calculated in step 66 to find the next word in the line buffer and store it in a word buffer. This step is described in greater detail with respect to FIG. 7. In step 69, the microprocessor checks if the found word is a null, indicating that the line buffer is empty or no word was found. If the found word is not a null, then step 70 is implemented, in which the word in the word buffer is added to the word list. The process then returns to step 68 to find the next word in the line buffer. If a null was found in step 69, then the process continues to step 71, where the first word from the word list is retrieved and is removed from the word list. The process then continues to step 73.

Figure 4B:
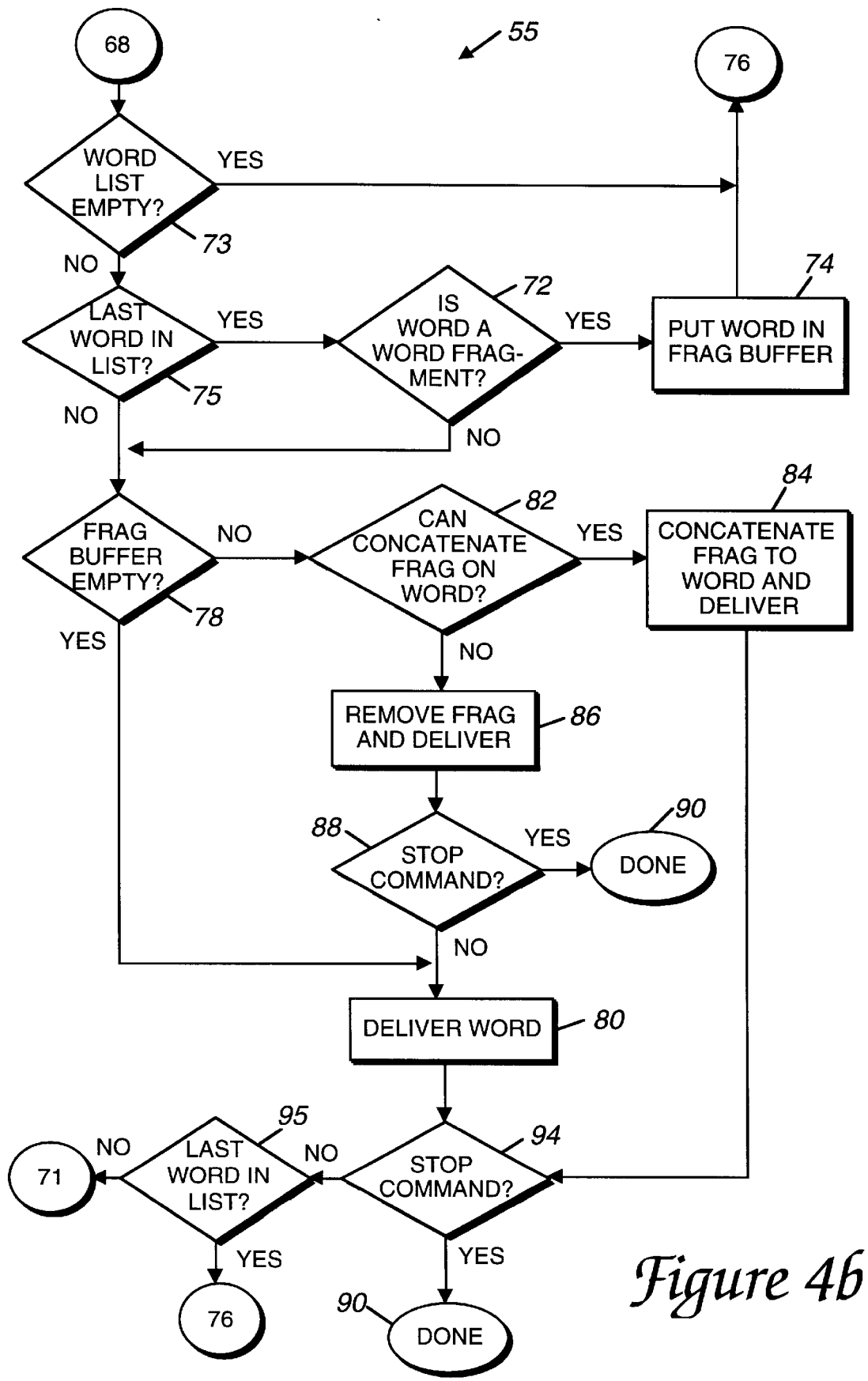
FIG. 4b is a flow diagram illustrating the a second portion of the process of the present invention for identifying words in a PDL file.

FIG. 4b continues the process 53 of the present invention from step 71. In step 73, the microprocessor checks if the word list is empty, i.e. if no word was available to be retrieved in step 71. If so, the process continues to step 76 (detailed below). If the word list is not empty, the process continues to step 75, where the microprocessor checks if the word last retrieved from the word list (the "current word") is the last word in the word list. If so, step 72 is implemented, in which the microprocessor checks if the current word is a word fragment, i.e., if the current word is a portion of a larger word that is continued on the next line, as in the case when a hyphen occurs at the end of the word fragment. The process of determining if the word is a word fragment is detailed with respect to FIG. 8. If the current word is not a word fragment, the process continues to step 78 (detailed below). If the current word is a word fragment, then step 74 is implemented, in which the current word loaded into the frag buffer. The frag buffer stores one or more characters which were determined to be a word fragment in step 72. The process then continues to step 76 (see FIG. 4a), in which the microprocessor determines if the last character examined was at the end of the page in the PDL file and, thus, a complete page was processed. This can be determined by checking if an end-of-page indication (such as an end-of-page command) was found in the PDL file in step 64 when characters were added to the line buffer. If so, the process returns to step 58, where the microprocessor determines if line mode has been set for the next page. If a page is not completely processed in step 76, then the microprocessor preferably adds the character in the current character buffer to the line buffer in step 77. The process then returns to step 62, where the microprocessor checks if all the characters in the PDL file have been processed, and, if not, stores another line of characters from the PDL file in the line buffer in step 64.

If the current word is not the last word in the line buffer in step 75 (FIG. 4b), or if the word is not a word fragment in step 72, then the process continues to step 78. In step 78, the CPU checks if the frag buffer is empty. If it is, the word is delivered to the client in step 80. When delivering the word to the client, the microprocessor preferably delivers additional information as well. Each character of the word is delivered as a character code which identifies the character. In addition, a character number of the first character of the word is delivered with the word; the character number can be stored in the line buffer with its associated word. This number indicates how many characters preceded the first character of the word on the page; for example, a character number for the "f" in the word "foobar" might be #64, which indicates that "f" is the 64th character on the page. A page number is also delivered with the word which identifies the page (from the beginning of the file) on which the word is positioned. Finally, bounding box coordinates of each word are delivered. A bounding box for each word fragment in a word (if applicable) is preferably delivered. A bounding box is a rectangle whose sides are positioned just outside the edges of the character so that the character is completely enclosed. In the described embodiment, two sets of coordinates for opposite corners of the bounding box are delivered. The client can often use the bounding box, for example, to highlight the received word in a text editor. In an alternate embodiment, a current word can be retrieved from the word buffer and delivered to client instead of being retrieved from the word list, as described above.

Alternatively, in step 80, the identified word can be compared to a search word sent to the process of FIG. 4a–4b by the client. If the identified word matches the search word, the identified word can be stored in a matched word list. Approximate matches, such as matching a search word to an identified word while ignoring plural forms, "-ing" forms, etc., can also be made. When all words in the PDL file which approximately match the search word are identified and stored in the matched word list, the words in the matched word list (or their coordinates) can be provided to the client.

If the frag buffer is not empty in step 78, then step 82 is implemented, in which the microprocessor checks if the word fragment can be concatenated with the current word. The process of checking if the fragment can be concatenated with the word is detailed with respect to FIG. 9. If concatenation is possible, the fragment is concatenated with the word and the resulting word (and additional information as detailed in step 80) is delivered to the client in step 84. If the fragment cannot be concatenated with the word, then the word fragment is removed from the frag buffer and is delivered to the client as a complete word in step 86 similarly as described in step 80. After step 86, step 88 is implemented, in which the microprocessor checks for a stop command from the client. This is a command from the client which indicates that no further words from the PDL file are currently needed, i.e. if the client application program only needed one word from the PDL file, it would issue a stop command after one word was delivered. If a stop command has been received, the process is complete as indicated at 90. If no stop command has been received, the process delivers the current word to the client in step 80, as described above.

After step 80, step 92, or step 84, the microprocessor checks in step 94 if a "stop" command from the client has been received, similar to step 88 described above. If a stop command has been received, the process is complete as indicated at 90. If no stop command has been received, the process continues to step 95, where the microprocessor checks if the current word was the last word in the word list. If not, the process continues to step 71 to retrieve the next word from the word list. If the current word was the last word in the list, the process continues to step 76, where the microprocessor checks if a page of characters has been processed as described above.

As shown in FIG. 4a, in step 62 the microprocessor checks if all the characters of the PDL file have been processed. If so, then step 96 is implemented, in which the microprocessor checks if the fragment buffer is empty. If it is, then the process is complete as indicated at 97. If the frag buffer is not empty, then the word fragment is removed from the frag buffer and delivered to the client in step 98. The process is then complete as indicated at 97.

Figure 5:
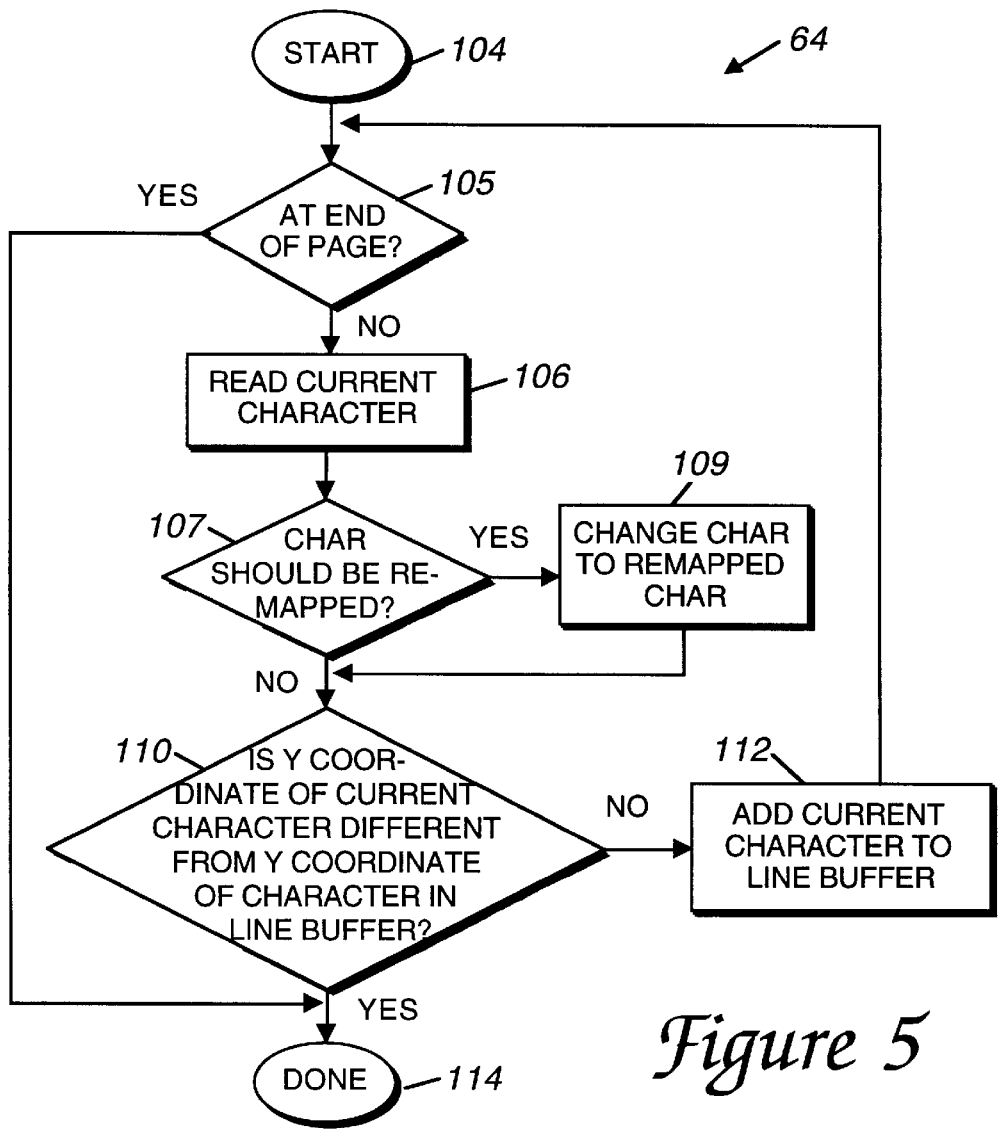
FIG. 5 is a flow diagram illustrating a step of FIG. 4a in which characters from a PDL page are copied into a line buffer.

FIG. 5 is a flow diagram illustrating step 64 of FIG. 4a, in which characters from the PDL page are copied into the line buffer. The process begins at 104, and, in step 105, the microprocessor checks if there has been an end of page indication found in the commands of the PDL file, which indicates that no more characters are stored on the current PDL page. If there is no end-of-page indication, the next character is read from the PDL page in step 106. The current character is retrieved from the PDL file if line mode has been selected, and the character is retrieved from the page buffer if page mode has been selected. To retrieve the character, the process of the present invention executes the commands and operators of the PDL page until a character is found, similarly to an output device which must execute the PDL code to display character images. When a character is found in the PDL data, the microprocessor thus retrieves it as it was meant to be displayed. This prevents errors which might occur if characters were simply searched for in the PDL data. For example, a command to display a character three times might appear as a loop command in the PDL file, where the character to be displayed only appears once. By executing the loop using an interpreter, the microprocessor receives the three characters that would be displayed. In addition, by executing the code in the PDL file, the microprocessor receives one character at a time, even if a string of characters is stored for a single display command in the file. This is because an output device only displays and processes one character at a time when executing a PDL file due to the way the characters are defined in the PDL file, as is well known to those skilled in the art.

When a character is found in the PDL file, the microprocessor examines the "graphics state" of the PDL interpreter. The graphics state is a collection of values which can apply to the current character and are maintained and updated as the PDL instructions are executed. For example, the position of a pointer which points to an instruction is updated, and the font type, color, rotation, etc. of the current character is found and updated. From the graphics state, the font, size, orientation, etc. of the character can be determined, as is well-known to those skilled in the art.

In step 107, the microprocessor examines the font and other information about the retrieved character and determines if the character must be remapped to a new character in the client's scheme. For example, a character code of "97," which is typically an "a" character, may actually be a different character, such as a space, in the font designated for the character in the PDL file. If a character requires remapping, in step 109 the character code is converted to the code as designated in the font information. This new code must be compatible with the client so that the client can read the character correctly. Once the character has been remapped, if necessary, the retrieved character from the PDL file is considered the "current character" and is preferably stored in the current character buffer. The process then continues to step 110. In step 110, the microprocessor checks if the y coordinate of the current character is different from the y coordinate of a character in the line buffer. The last character in the line buffer, or any other character in the line buffer, can be compared to the current character, since all the characters in the line buffer have the same y coordinate. If the y coordinate is not different, the process continues to step 112, where the current character is added to the line buffer, i.e. the current character is appended to the end of the line of characters stored in the line buffer. The process then returns to step 105 check if the end of the page has been reached, and, if not, to read another character from the PDL page in step 106. If the y coordinate of the current character is different from y coordinate of a character in the line buffer in step 110, then the end of a line of text (as finally displayed in the display order) has been reached and the current character is thus positioned on a new line. The process is thus complete as indicated at 114.

Figure 6:
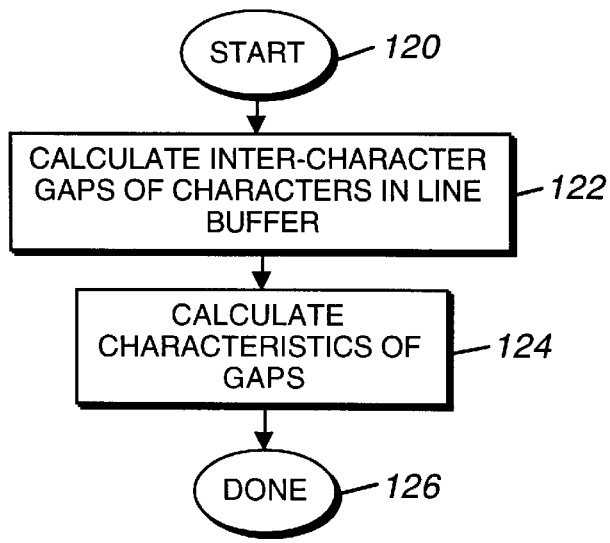
FIG. 6 is a flow diagram illustrating a step of FIG. 4a in which line characteristics are computed for the characters stored in the line buffer.

FIG. 6 is a flow diagram illustrating step 66 of FIG. 4a, in which line characteristics are computed for the line of characters stored in the line buffer. The process begins at 120. In step 122, the inter-character gaps of the characters in the line buffer are calculated. In the described embodiment, the gaps are calculated in terms of the size of the font of each character in the line buffer. These units are known as "ems," where one em is equal to n points, n being the number of points specifying the font of the character. "Points" are units which are used to describe fonts and printing; for example, in font systems produced by Adobe Systems, Inc., one point equals 1/72 of an inch. For example, for characters having a 12-point Times font, a gap between the characters can be specified as 0.5 ems, which indicates that the gap is one-half of 12-points, or 6 points (1/12 of an inch).

Inter-character gaps are not typically specified as distinct characters in a PDL file. To calculate the inter-character gaps, the font, size and other information about the character must be examined. Sufficient information is included within the font and size information to determine the beginning and end positions of each character in the line buffer. The inter-character gaps can be calculated using the coordinates of each character and the beginning and ending positions of the character.

In step 124, characteristics of the gaps are calculated and made ready for word recognition. In the described embodiment, several characteristics are calculated which are specifically used to distinguish words in the line. The calculation of these characteristics are detailed with respect to FIG. 6a. The process is then complete as indicated at 126.

Figure 6A:
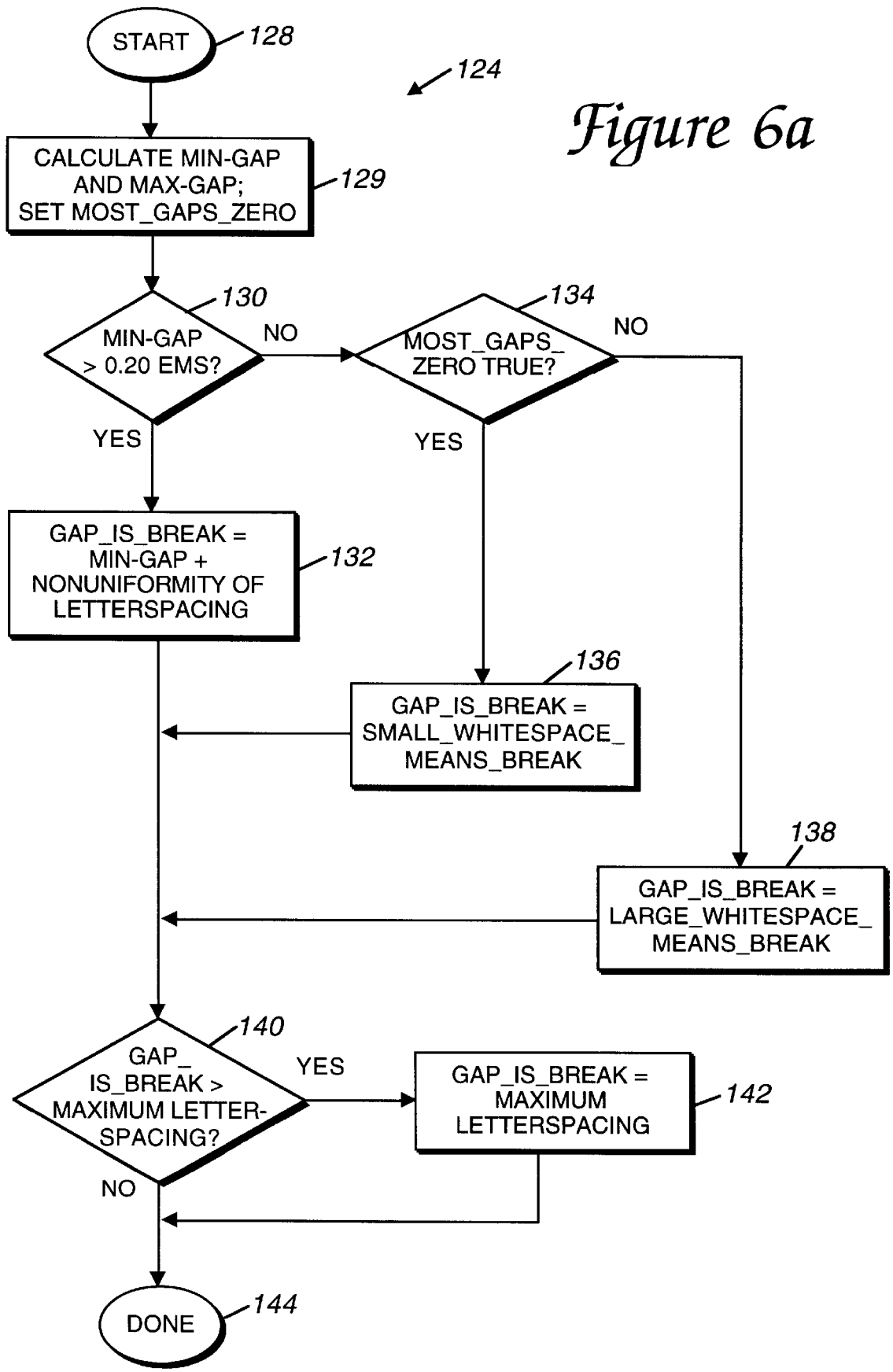
FIG. 6a is a flow diagram illustrating a step of FIG. 6 in which the characteristics of inter-character gaps are calculated.

FIG. 6a is a flow diagram illustrating step 124 of FIG. 6, in which the characteristics of the inter-character gaps are calculated. The process begins at 128, and, in a step 129, the min-gap and max-gap characteristics are calculated and the most-gaps-zero flag is set. The "min-gap" characteristic is chosen as the smallest inter-character gap in the line buffer; this gap can be negative if characters overlap. The "max-gap" is chosen as the largest inter-character gap in the line buffer, and may also be negative if characters overlap. The "most-gaps-zero" flag is set if two-thirds or more of the inter-character gaps have dimensions of zero or less.

The remaining steps of FIG. 6a are for calculating a "gap-is-break" value from the characteristics calculated above which is used in step 68 of the main process. A number of constants are used to calculate gap-is-break; in the described embodiment, the constants have the values shown below in Table 1. These constants can have other values in different embodiments.

TABLE 1

| Nonuniformity of letterspacing = 0.003 ems |
| Small-whitespace-means-break = 0.05 ems |
| Large-whitespace-means-break = 0.18 ems |
| Maximum letterspacing = 2.00 ems |
| Minimum letterspacing = −1.00 ems |

The term "letterspacing" refers to the practice of adding an amount of space between all characters on a text line for justification, emphasizing the characters, etc. Positive letterspacing moves characters apart on a line, and negative letterspacing moves characters closer together. In step 130, the microprocessor checks if min-gap is greater than 0.20 ems. This step checks if the characters are letterspaced, which occurs if all the inter-character gaps are greater than 0.20 ems (other values can be used in alternate embodiments). If so, step 132 is implemented, in which gap-is-break is set equal to min-gap+Nonuniformity of letterspacing. If min-gap is not greater than 0.20 ems in step 130, the microprocessor checks if the most-gaps-zero flag is true. If so, step 136 is implemented, in which gap-is-break is set equal to Small-whitespace-means-break. If the most-gaps-zero flag is not set in step 134, the process continues to step 138, in which gap-is-break is set equal to Large-whitespace-means-break.

After steps 132, 136, or 138, the process continues to step 140, in which the microprocessor checks if gap-is-break is greater than the maximum letterspacing. If so, gap-is-break is set equal to the maximum letterspacing in step 142. After step 142, or if gap-is-break is not greater than the maximum letterspacing in step 140, the process is complete as indicated at 144.

Figure 7:
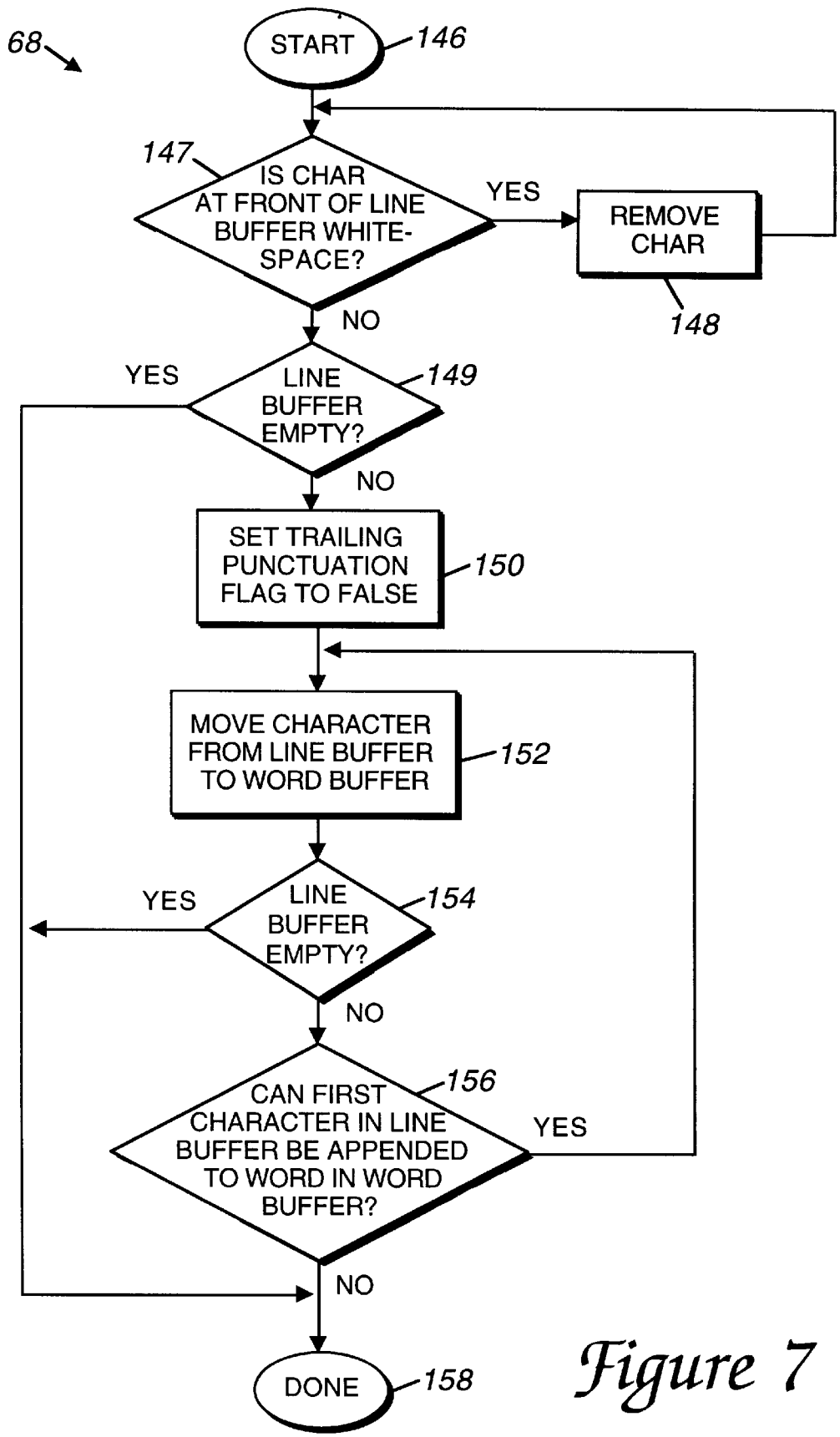
FIG. 7 is a flow diagram illustrating a step of FIG. 4a in which a next word break in the line buffer is found.

FIG. 7 is a flow diagram illustrating step 68 of FIG. 4a, in which the next word break in the line buffer is found. The process begins at 146. In step 147, the microprocessor checks if the character at the front of the line buffer is whitespace, such as a space character or tab character. If so, then the character is removed in step 148, since beginning whitespace characters should not be counted in words. The process then returns to step 147 to check for another whitespace character. If the character at the front of the line buffer is not a whitespace character, step 149 is initiated, in which the microprocessor checks if the line buffer is empty. If so, the process is complete at 158. If not, a trailing punctuation flag is initialized to false in step 150. This flag is used in step 156, described below. In step 152, the first character in the line buffer is moved from the line buffer to the word buffer. The character following the moved character then becomes the first character in the line buffer. The characters in the word buffer are collectively referred to as a "word." In step 154, the process checks if the line buffer is empty. If so, all the characters in the line buffer have been moved and processed, and the process is complete at 158. If the line buffer is not empty, the process continues to step 156, in which the microprocessor checks if the first character in the line buffer can be appended to the end of the word in the word buffer. If the character cannot be appended, then a word break has been found between the characters. In the described embodiment, the microprocessor implements several heuristics to determine if there is a word break and, thus, if a character should be added to the word buffer. These heuristics are divided into two parts: heuristics which are used for the gaps between characters and heuristics which are used for the character types. Herein, word breaks based on gap analysis are referred to as "spaces." Word breaks based on character types are referred to as "termination characters." The heuristics used for the gaps are illustrated with respect to FIG. 7a. The heuristics used for the termination characters are illustrated with respect to FIG. 7b. Note that these heuristics can be done in any order, or simultaneously. If the first character in the line buffer can be appended to the word in the word buffer, the process returns to step 152 to move another character from the line buffer to the word buffer. If not, the process is complete as indicated at 158.

Figure 7A:
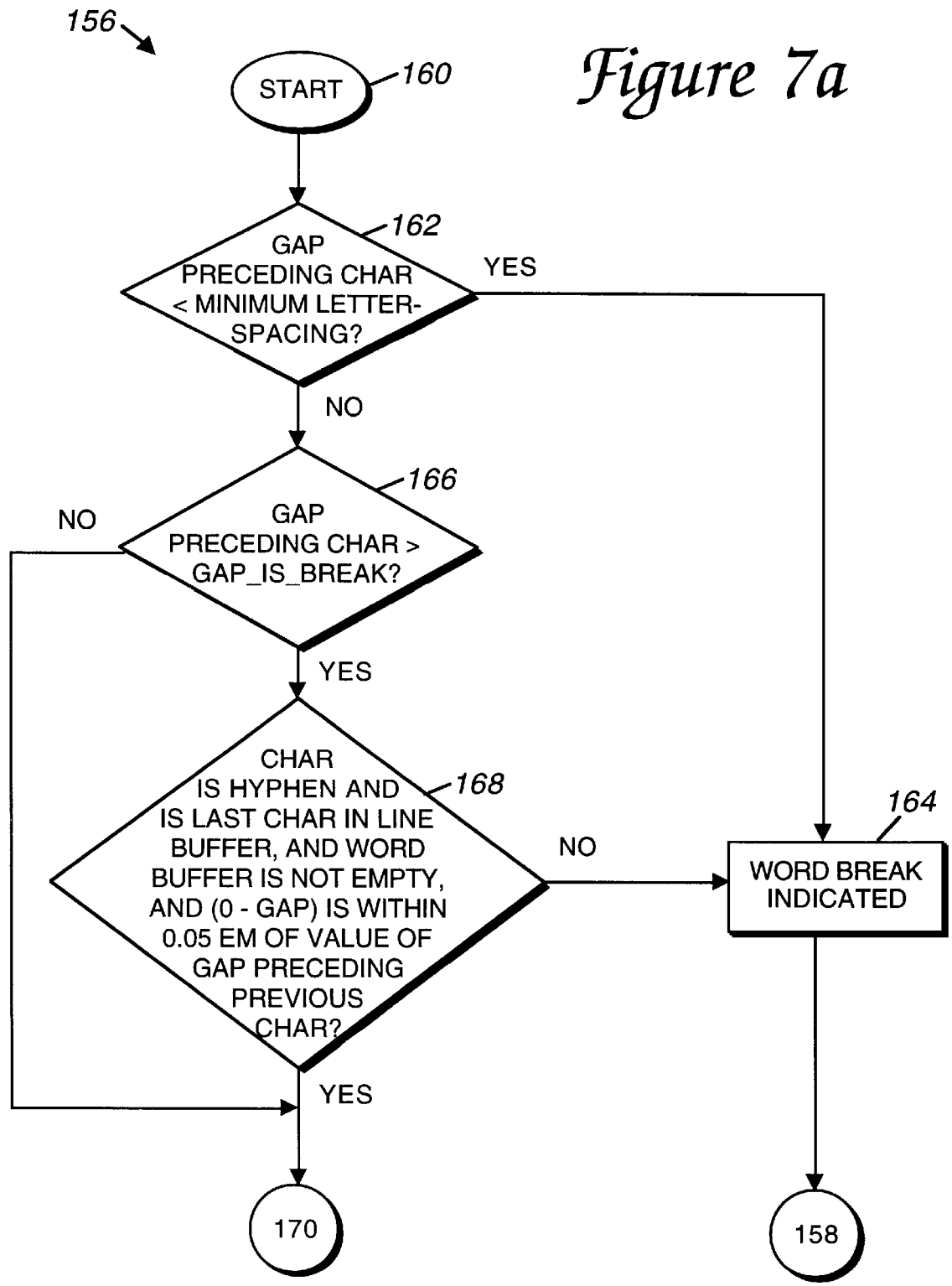
FIG. 7a is a flow chart illustrating the gap heuristics used in a step of FIG. 7 to determine if a word break occurs and if a character should be added to the word buffer.

FIG. 7a is a flow chart illustrating the gap heuristics used in step 156 of FIG. 7 to determine if a word break occurs and if a character should be added to the word buffer. These heuristics check several characteristics of the gaps: if the gaps between characters of the line are letterspaced, if the characters are spaced more than the maximum letterspacing or less than the minimum letterspacing, and if a gap is large enough to cause a word break based on the typical inter-character gap. The process begins at 160, and in step 162, the microprocessor checks if the gap preceding the current character is less than the minimum letterspacing (specified with respect to FIG. 6a). This means that the characters are spaced more closely together than the average spacing and is a severe overlap of characters; a word break has occurred. This can be caused by tabular information that has over-flowed column boundaries on a page. The process then continues to step 158 of FIG. 7. If the gap is not less than the minimum letter spacing in step 162, then, in step 166, the microprocessor checks if the size of the gap preceding the current character is greater than the value of gap-is-break (calculated as shown in FIG. 6a). If not, the process continues to step 170 of FIG. 7. If so, the gap is large enough to indicate a word break, except for the conditions which must be checked in step 168.

Step 168 is included as an heuristic to check for specific non-standard conditions. Some application programs which create PDL files have different or non-standard ways of organizing their output files. If such application programs and their output are known, the non-standard formats can be detected and processed by adding specific heuristics. For example, one version of a popular pagination system creates non-standard PostScript files which may contain negatively-letterspaced characters with a hyphen in an end-of-line word, where the hyphen does not overlap any characters. A heuristic, such as step 168, can be added so that the hyphen will be considered part of the word and so that a word break will not erroneously be found. In step 168, the microprocessor makes a check for several conditions. If the character is a hyphen and is the last character in the line buffer, and if the word buffer is not empty and the value of (0−gap) is within 0.05 em of the value of the gap preceding the previous character, then the non-standard hyphen referred to above is present and a word break should not be indicated; the process thus continues to step 170 of FIG. 7. If any or all of these conditions are not true, then a word break is indicated in step 164 and the process continues to the completion of the process of FIG. 7 at 158. Other heuristics similar to those of step 168 can be added for other specific conditions and known nonstandard formatting of PDL files.

Figure 7B:
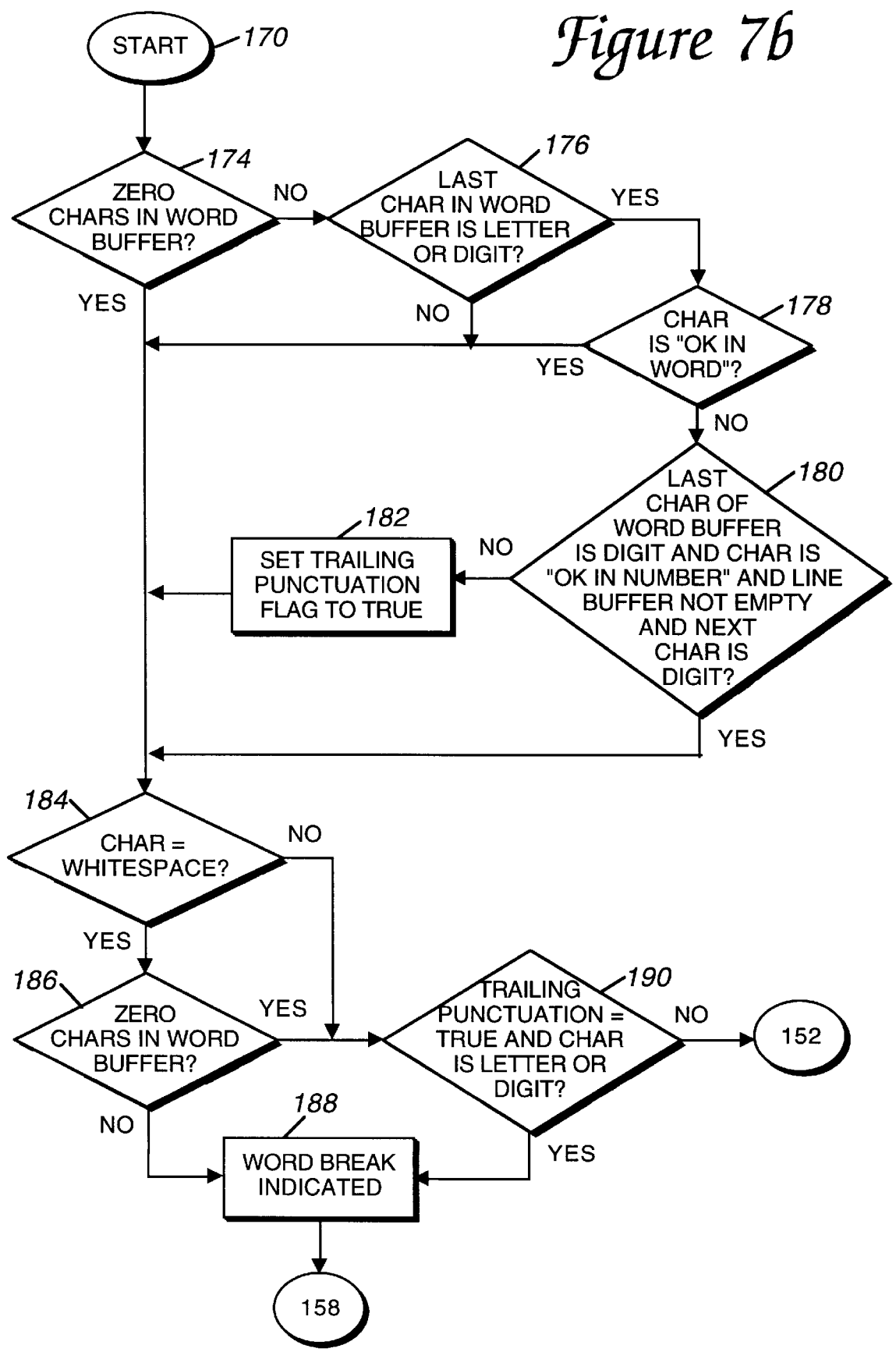
FIG. 7b is a flow chart illustrating the character heuristics used in a step of FIG. 7 to determine if a word break occurs and if a character should be added to the word buffer.

FIG. 7b is a flow chart illustrating the character heuristics used in step 156 of FIG. 7 to determine if a word break occurs and if a character should be added to the word buffer. These heuristics check several characteristics of the characters and if the character is a punctuation or white space mark and the character's position in the word to determine if a word break is present. A character's category, such as "whitespace," "punctuation," or "letter," can be found by accessing the table of additional information supplied by the client in step 52 of FIG. 4a. The process begins at 170, and in step 174, the microprocessor checks if there are zero characters in the word buffer. If so, then the process continues to step 184 (described below). If there already are characters in the word buffer, then the current character could be a trailing punctuation mark (i.e., a punctuation mark ending a word) (the trailing punctuation flag was set to false in step 150 of FIG. 7). The process continues to step 176, where the microprocessor checks if the last character in the word buffer is a letter or digit. If not, the process continues to step 184. If so, the current character might still be a trailing punctuation mark, so step 178 is implemented. In step 178, the microprocessor checks if the character is "OK in word," i.e., if the character can be positioned within a word of letters. If so, then the character is not a trailing punctuation mark, and the process continues to step 184. If not, the character is a punctuation mark; however, the punctuation mark might still be a comma within a number (such as the comma in "100,100"). In step 180, the microprocessor checks if the character is such an embedded punctuation mark by checking if the last character of the word buffer is a digit and the current character is "OK in number" (can be positioned within a number), and if the line buffer is not empty and if the next character is a digit. If these conditions are true, then the character is not a trailing punctuation mark, and the process continues to step 184. If any or all of these conditions are false, the process continues to step 182 and sets the trailing punctuation flag to true. The process then continues to step 184.

In step 184, the microprocessor checks if the character is a whitespace character. If not, step 190 is implemented (described below). If so, in step 186, the microprocessor checks if there are zero characters in the word buffer. If not, the whitespace character indicates a word break as shown in step 188; the process then continues to step 158 of FIG. 7. If there are no characters in the word buffer in step 186, then step 190 is implemented, in which the microprocessor checks if the trailing punctuation flag is true and the character is a letter or digit. If either or both of these conditions are false, the process continues to step 152 of FIG. 7 to get another character. This condition is used to detect if multiple trailing punctuation marks, such as three periods or exclamation points, are present at the end of a word. If both conditions are true, then a word break is indicated as shown in step 188. The process then continues to the completion at 158 of the process of FIG. 7. Other character and gap heuristics besides the ones shown in FIGS. 7a and 7b can also be used to determine word breaks.

Figure 8:
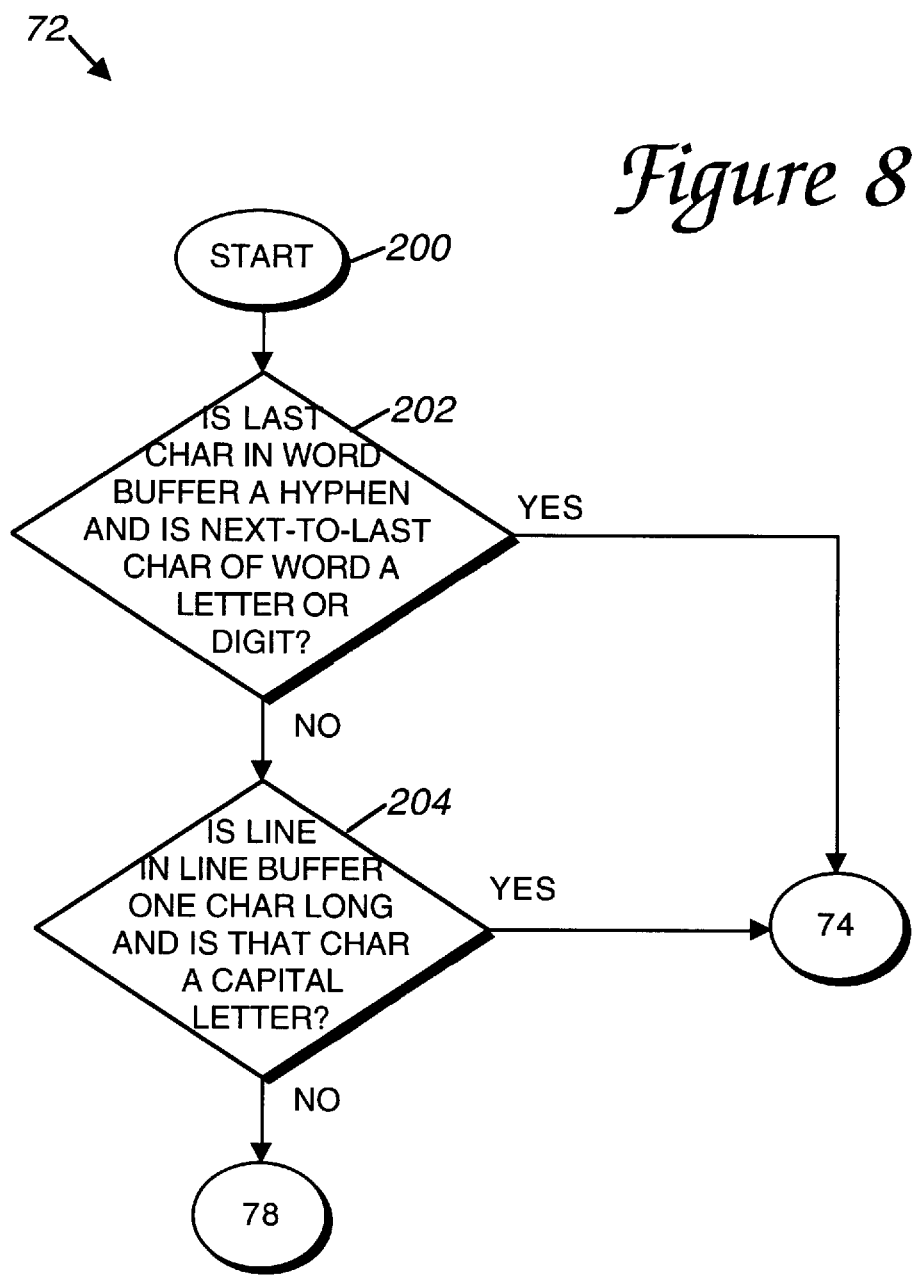
FIG. 8 is a flow diagram illustrating a step of FIG. 4b in which the word in the word buffer is determined to be a word fragment.

FIG. 8 is a flow diagram illustrating step 72 of FIG. 4b, where the microprocessor determines if the word in the word buffer is a word fragment. That is, if the word in the buffer has a hyphen type character at its end, or if the word in the buffer is a "drop-cap," then the word is really a fragment of a larger word and should be combined with the first word on the next line. The process begins at 200, and, in a step 202, the microprocessor checks if the last character in the word buffer is a hyphen and if the next-to-last character of the word is a letter or digit. If both these conditions are true, then the word in the word buffer may be the first portion of a hyphenated word. The process continues to step 74 of FIG. 4b, where the word is removed from the word buffer and placed in the frag buffer as a word fragment. If either or both of these conditions are not true, then the process continues to step 204. In step 204, the microprocessor checks if the line in the line buffer is one character long, and if that one character is a capital letter. If both these conditions are true, then the word in the word buffer may be a "drop-cap" and is added to the frag buffer as a word fragment in step 74 of FIG. 4b. If either or both of these conditions are false, then the process continues to step 78 of FIG. 4b, as detailed above.

Figure 9:
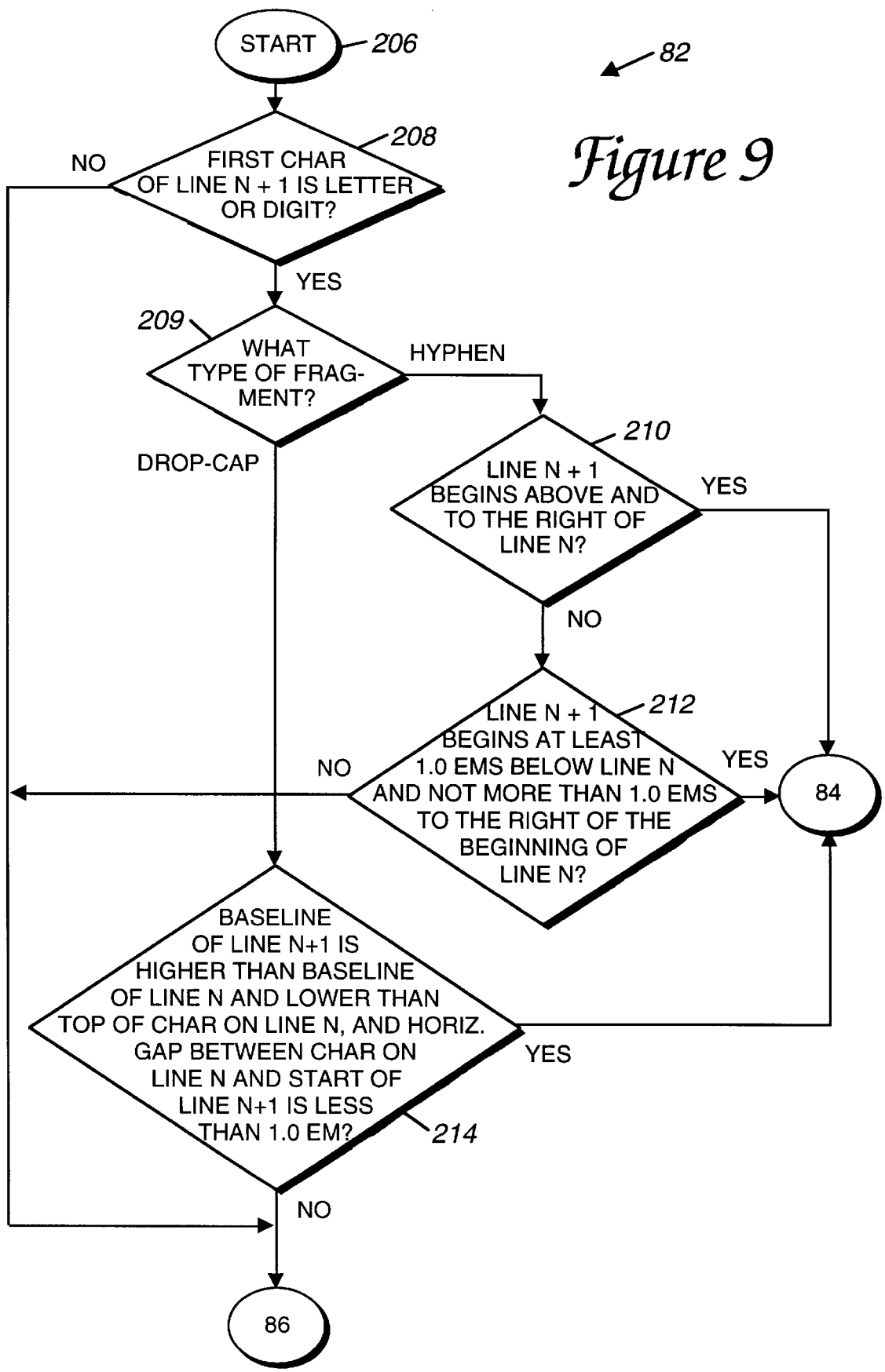
FIG. 9 is a flow diagram illustrating a step of FIG. 4b it is determined if the fragment in the frag buffer and the word in the word buffer can be concatenated.

FIG. 9 is a flow diagram illustrating step 82 of FIG. 4b, where the microprocessor determines if the fragment in the frag buffer and the word in the word buffer can be concatenated. As detailed below, steps 210 and 212 check for concatenating a hyphenated fragment with the next word, and step 214 checks for concatenating a drop-cap fragment with the next word. The process starts at 206. In step 208, the microprocessor checks if the first character of line N+1 is a letter or digit. As referenced herein, "line N" refers to the line to which the fragment in the frag buffer belongs. "Line N+1" is the line following line N, where the first word of line N+1 might be part of the fragment from line N. If the first character of line N+1 is not a letter or digit in step 208, then the fragment is a complete word in itself, and the process continues to step 86 of FIG. 4b to deliver the fragment as a word to the client. If first character is a letter or digit, in step 209, the microprocessor checks what type of fragment it is by checking the end character type of the fragment. If the fragment is a hyphenated fragment, the process continues to step 210, where the microprocessor checks if line N+1 begins above and to the right of line N. Assuming that the coordinates of the lines have been previously corrected for non-standard alignment (i.e., not left-to-right orientation), the microprocessor is checking if line N+1 is positioned at the top of a new column to the right of line N, which would indicate that the word fragment has a hyphen and should be joined to the first word of line N+1. Thus, if the conditions are true, the process continues to step 84 of FIG. 4b, where the fragment and next word are concatenated and delivered to the client. If the conditions are false, the process continues to step 212, where the microprocessor checks if line N+1 begins at least 1.0 ems below line N and not more than 1.0 ems to the right of the beginning of line N. Here, the microprocessor is checking if line N+1 is positioned just below line N. If the conditions are true, the fragment is considered to be a hyphenated fragment and is concatenated with the word in the word buffer in step 84 of FIG. 4b. If the conditions are false, the process continues to step 86 to deliver the fragment as a word.

If the fragment is determined to be a drop-cap fragment in step 209, then step 214 is implemented. In step 214, the microprocessor checks if the baseline of line N+1 is higher than the baseline of line N, that the baseline of line N+1 is lower than the top of the character on line N, and that the horizontal gap between the character on line N and the start of line N+1 is less than 1.0 em. If these conditions are true, then the fragment is considered a drop-cap fragment, since the baseline of the second character is typically positioned above the baseline but below the top of the character it is positioned next to. The process thus continues to step 84 of FIG. 4b to concatenate the drop-cap fragment with the word in the word buffer. If any or all of the conditions of step 214 are false, then the process continues to step 86 of FIG. 4b to deliver the fragment as a word to the client.

While this invention has been described in terms of several preferred embodiments, it is contemplated that alterations, modifications and permutations thereof will become apparent to those skilled in the art upon a reading of the specification and study of the drawings. For example, other types of characters and conditions can be checked to determine if a word is a word fragment. In addition, other sorting methods can be used to sort the characters on a page of the PDL file. Further, additional information associated with a word can be delivered with a word to the client.

Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A method for identifying words in a page description language file containing text characters and associated character position data, the character position data defining a display order of the text characters independent of the storage order of the text characters in the file, the method comprising:

reading text characters and the associated character position data of the text characters from said page description language file;

using the character position data to distinguish text characters that are part of the same word from text characters that are not part of the same word; and storing text characters that are part of the same word into a word buffer.

2. A method as recited in claim 1 further comprising sorting said characters from said collection into a display order prior to storing said characters in said word buffer.

3. A method as recited in claim 1 wherein said character position data includes x and y coordinates for a character or for a group of characters.

4. The method of claim 3, wherein using the character position data includes using the x and y coordinates to determine whether the associated text character or characters are placed in the word buffer.

5. A method as recited in claim 3 wherein said step of storing said characters into a word buffer includes storing characters into a line buffer, wherein said characters from said line buffer are stored in said word buffer.

6. A method as recited in claim 5 wherein characters having the same y coordinate are stored in said line buffer at one time.

7. A method as recited in claim 6 further comprising calculating line characteristics of said characters stored in said line buffer and utilizing said line characteristics to store characters from said line buffer in said word buffer.

8. A method as recited in claim 7 wherein said step of storing characters in said word buffer includes sequentially storing characters in said word buffer from said line buffer until a word break is detected.

9. A method as recited in claim 8 wherein said word break includes a change in y coordinate of a character, a space, and a termination character.

10. A method as recited in claim 9 wherein a word in said word buffer is stored in a word list each time a word break is detected, and wherein a word in said word list is provided to said client process.

11. A method as recited in claim 9 wherein said characters in a word from said word list are considered a word fragment if a last character of said word from said word list is a hyphen or if said character in said word from said word list is a drop-cap.

12. A method as recited in claim 11 wherein said word fragment is concatenated with the next word identified after said word fragment.

13. A method as recited in claim 1 further comprising providing said identified word to a client process when said client process requests said identified word.

14. A method for detecting words in a computer-readable page description language file describing the appearance and position of text characters, the method comprising:
(a) reading a description including the positions of a plurality of text characters from said page description language file and storing the text characters in a line buffer;
(b) calculating gap and character characteristics of text characters in said line buffer from the description of the positions of the text characters read from the pare description file;
(c) moving a character from said line buffer into a word buffer;
(d) repeating steps (c) and (d) until the first of a word break and a line buffer empty is detected, said word break being detected using said gap and character characteristics; and
(e) identifying said characters in said word buffer as a word.

15. A method as recited in claim 14 further comprising sorting said characters from said page description file into a display order prior to storing said characters in said line buffer.

16. A method as recited in claim 14 wherein said step of reading includes reading one character at a time from said page description file by executing commands included within said page description file.

17. A method as recited in claim 16 wherein said step of calculating gap and character characteristics includes calculating a minimum gap between characters in said line buffer and a maximum gap between characters in said line buffer.

18. A method as recited in claim 14 further comprising a step (f) of storing said word from said word buffer in a word list.

19. A method as recited in claim 18 further comprising a step (g) of repeating steps (c) through (f) until said line buffer is empty.

20. A method as recited in claim 19 further comprising a step (h) of repeating steps (c) through (g) until words have been identified for characters of an entire page in said page description language file.

21. A method as recited in claim 19 wherein said words in said word list are provided to a client process when said client process requests said words.

22. A computer-implemented method for searching for a word in a page description language file containing text characters to be displayed or printed and associated character coordinates for each text character or group of text characters, the character coordinates defining a display order of the text characters independent of the storage order of the text characters in the file, the method comprising:
(a) receiving a search word;
(b) processing text characters in said page description language file based upon associated character coordinates of the text characters to create a list of identified words including word coordinates;
(c) comparing said list of identified words to said search word; and
(d) providing the coordinates of words in said list of identified words which match said search word.

23. A method as recited in claim 22 wherein said search word is received from a client process, and wherein said coordinates are provided to said client process.

24. The method of claim 22, wherein the character coordinates include x and y coordinates.

25. A system for identifying words in a page description language file, comprising:
a data processing apparatus storing a page description language file having characters, each character associated with position data and characteristics data; and
a word identifying program implemented on the data processing apparatus to distinguish text characters that are part of the same word from text characters that are not part of the same word to group the characters into words according to the characteristics data and position data.

26. A system as recited in claim 25, wherein each character is associated with an x coordinate and a y coordinate to define an x,y coordinate pair indicating where the character is to be displayed on a page.

27. A system as recited in claim 26, further comprising a line buffer, the word identifying program storing the characters having a same y coordinate into the line buffer.

28. A system as recited in claim 27, further comprising a word buffer, wherein the word identifying program sequentially stores characters from the line buffer into the word buffer until a word break is detected based on the characteristics data.

29. The method of claim 25, wherein the character position data include x and y coordinates.

30. A system for identifying words in a page description language file, comprising:
a storage device for storing a page description language file having a plurality of text characters, each text character being associated with position data that define a display order of the text characters independent of the storage order of the text characters in the file; and
a data processing apparatus configured by a word identifying program to:
sort the text characters in the page description language file by their position data, analyze the position data to distinguish text characters that are part of the same word from text characters that are not part of the same word; and
group the characters that are part of the same word.

31. A system for identifying words as recited in claim 30, further comprising:
a client process capable of processing words and requesting words to process; and
transfer means for transferring the at least one word to the client process at a request of the client process.

32. A system for identifying words as recited in claim 30, wherein the data processing apparatus is further configured to read the page description language file to retrieve one text character at a time.

33. A system for identifying words as recited in claim 32, wherein the page description language file includes PDL commands, and wherein the data processing apparatus reads the page description language file, in part, by executing the PDL commands.

34. A system for identifying words as recited in claim 30, wherein the data processing apparatus sorts the text characters in a display order prior to grouping the text characters.

35. A system for identifying words as recited in claim 30, wherein each text character has an associated x coordinate and y coordinate that define an x,y coordinate pair indicating where the character is to be displayed on a page, and wherein the data processing apparatus sorts the text characters first by the y coordinate and then by the x coordinates prior to grouping the text characters.

36. A system for identifying words as recited in claim 30, further comprising a line buffer, wherein the data processing apparatus is further configured to store text characters read from the page description language file in the line buffer.

37. A system for identifying words as recited in claim 36, wherein each text character has an associated x coordinate and y coordinate that define an x,y coordinate pair indicating where the text character is to be displayed on a page, and wherein the data processing apparatus stores text characters in the line buffer having a same y coordinate, such that the text characters of the same y coordinate can be grouped together into words.

38. A system for identifying words as recited in claim 37, further comprising a word buffer, wherein the data processing apparatus is further configured to sequentially store text characters from the line buffer into the word buffer until a word break is detected.

39. A system for identifying words as recited in claim 38, wherein the data processing apparatus determines a word break by the first of a termination character, an end of the line buffer, and a space being detected.

40. A system for identifying words as recited in claim 39, wherein the data processing apparatus is further configured to detect a space by a heuristic that considers the difference in x coordinates between adjacent text characters in the line buffer.

41. A system for identifying words as recited in claim 40, wherein the data processing apparatus is further configured to store the word in the word buffer into a word list.

42. The method of claim 30, wherein the character position data include x and y coordinates.

* * * * *